United States Patent [19]

Taylor et al.

[11] Patent Number: 4,701,438

[45] Date of Patent: Oct. 20, 1987

[54] TREATING COMPOSITIONS FOR USED FRYING OILS

[75] Inventors: Dennis R. Taylor; Kevin P. Gallavan, both of Pleasanton, Calif.

[73] Assignee: Kaiser Aluminum & Chemical Corporation, Oakland, Calif.

[21] Appl. No.: 896,041

[22] Filed: Aug. 13, 1986

[51] Int. Cl.$^4$ .................. B01J 20/04; B01J 20/08; B01J 20/12

[52] U.S. Cl. .................. 502/405; 502/407; 502/410; 502/415; 426/423

[58] Field of Search ............... 426/417, 423; 260/425, 260/427, 428; 502/405, 407, 410, 415, 251, 263

[56] References Cited

U.S. PATENT DOCUMENTS 2,446,799  8/1948  Winding ................... 502/415 X
2,475,328  7/1949  La Lande ................. 502/410 X
4,112,129  9/1978  Duensing et al. ........... 502/410 X

FOREIGN PATENT DOCUMENTS 295623  8/1928  United Kingdom ............... 502/405

Primary Examiner—W. J. Shine
Attorney, Agent, or Firm—Andrew E. Barlay

[57] ABSTRACT

Used frying oils are regenerated and made suitable for reuse by treating the used oils with a composition consisting of a mixture of activated clay or magnesium silicate with a gel-derived alumina. The treating composition contains from about 15% by weight to about 75% by weight gel-derived alumina, balance activated clay or magnesium silicate. Treatment with the composition significantly reduces the free fatty acid content of the used oil with simultaneous improvement in color and other important properties thus resulting in a purified oil of substantially extended service life.

3 Claims, No Drawings

TREATING COMPOSITIONS FOR USED FRYING OILS

BACKGROUND OF THE INVENTION

In commercial food processing and particularly in fast food preparation copious quantities of frying oils and fats are being utilized. Frying of food, such as meat patties, chicken, fish and potatoes, takes place at elevated temperatures and the frying oils and fats, apart from food residues, become contaminated with degradation products of the oils and fats. Simple filtration may remove suspended solids, however it does not take care of dissolved impurities and of the darkened color of the used oils and fats. The dissolved impurities are generally degradation products, such as free fatty acids, aldehydes, ketones, color and odor-forming complex compounds. The presence of these products render the frying oil and fats unsuitable for further use and unless the used oils and fats are purified, health, taste and aesthetic reasons require their disposal.

Several treating agents have been used in the past to purify used oils and fats. Most of these agents, such as clays, magnesium silicates, zeolites, activated aluminas and charcoal, remove one or more of the impurities and/or color bodies. However, none of the known treating agents or composites thereof were found to be fully efficacious for the rejuvenation of used frying oils and fats. As a matter of fact, during treatment some of the acidic treating agents generate free fatty acids, while others, such as magnesium silicate generate soaps, thus the treatment itself is associated with the production of undesired by-products.

It has now been found that a treating composition, consisting of a mixture of acid activated clay or magnesium silicate and gel-derived alumina, accomplishes the desired purification of used frying oils and fats without the disadvantages associated with prior art treating compositions.

SUMMARY OF THE INVENTION

Used frying oils and fats are regenerated for renewed use by contacting the used oils and fats with a treating composition consisting of a mixture of activated clay or magnesium silicate and gel-derived alumina. The treating composition contains from about 15% to about 75% by weight gel-derived alumina or magnesium silicate, balance activated clay. The gel-derived alumina is characterized by a surface area in the range of 280 to 350 m$^2$/g, a pseudoboehmite content of at least 20% by weight and a loss on ignition (LOI) in the range of 24 to 32% by weight. The activated clay is an acid activated bentonite. The magnesium silicate utilized in the present invention is characterized by a nominal structure of 2MgO:5SiO$_2$ (the ratio of MgO:SiO$_2$ can vary) and it can be found in nature (talc, serpentine) or synthetized by the interaction of a magnesium salt and a soluble silicate. The surface area of suitable magnesium silicates is generally in the range from 400 to 500 m$^2$/g and it exhibits a loss on ignition (1 hour at 1000° C.) of about 20–30% by weight.

DETAILED DESCRIPTION OF THE INVENTION

This invention relates to the purification of used frying oils and fats by treatment with a clay-alumina or magnesium silicate-alumina composition. More particularly, it concerns the removal of degradation products and color bodies from used frying oils and fats by treating these oils and fats with a composition containing gel-derived, pseudoboehmitic alumina and activated clay or magnesium silicate.

For the purposes of this invention the term "frying oils and fats" refer to those animal and vegetable derived oils and fats which are customarily used in frying foods. These oils and fats are generally mixtures of mixed glycerides and include both saturated and unsaturated compounds and mixtures thereof. Typical oils and fats employed in the food industry include animal fats, lard and tallow; olive, peanut, corn, soybean, sunflower, safflower and fish oils. The major constituents in these oils and fats are esterified oleic and linoleic acids. Mixtures of oils and fats are also included within the meaning of the above definition.

"Activated clay" as used herein refers to bentonite clay activated with an acid, such as sulfuric acid, to remove acid-soluble constituents and impurities. The acid-treated clay is washed, dried and ground. Typical activated bentonite clay exhibits a surface area in the range of 275 m$^2$/g to 325 m$^2$/g; an acidity in the range of 3 to 12, expressed in mgKOH/g clay required for neutralization of an aqueous clay slurry containing 16.6 grams clay per liter of water; a particle size wherein at least 40% by weight of the particles pass through a screen having openings of 0.074 mm.

The expression "magnesium silicate" as referred to herein means a naturally occurring or synthetic hydrated magnesium silicate having a nominal composition of 2MgO:5SiO$_2$xH2O, a surface area in the range from about 400 to about 500 m$^2$/g, a loss on ignition, measured after heat treatment for 1 hour at 1000° C., from about 20 to about 30% by weight, a particle size, wherein from about 40 to about 70% by weight of the particles pass through a screen having openings of 0.074 mm.

The terms "gel-derived" or "pseudoboehmitic" alumina, as used herein relates to an alumina prepared by either (a): reacting a basic aluminum salt, such as sodium aluminate, with an acid or acidic aluminum salt solution, for example a mineral acid or an aqueous solution of Al$_2$(SO$_4$)$_3$, AlCl$_3$ or Al(NO$_3$); or (b): by reacting an acidic aluminum salt solution with a base, such as NaOH. The alumina suitable for being used in the treating composition of the present invention is characterized by a psuedoboehmite content of at least 20% by weight as determined by X-ray diffraction using copper K$\alpha$-radiation as described in U.S. Pat. No. 3,630,670. The alumina is further characterized by a surface area in the range of about 280 to about 350 m$^2$/g, a bulk density in the range of about 10–16 lbs/ft$^3$ (160–260 kg/m$^3$) and a loss on ignition (when heated to 1000° C. for 1 hour) in the range of about 24–32% by weight. The particle size of the gel-derived alumina employed is small, not less than 60% by weight passes through a screen having openings of 0.074 mm.

The treating composition employed for the purification of the used frying oils and fats contains from about 15% to about 75% by weight gel-derived alumina, balance activated clay or magnesium silicate. Preferably, the composition contains from about 30% to about 50% by weight gel-derived alumina, balance activated clay or magnesium silicate. The components are carefully admixed in order to obtain a mixture of substantial uniformity. To avoid segregation of the constituents of the treating composition, the particle size distribution of the individual components, i.e. the magnesium silicate or activated clay and alumina, is kept reasonably uniform. Preferably, the percentage of particles having a particle size below about 0.044 mm is minimized in order to avoid problems in the treatment step.

Treatment of the used frying oils or fats with the treatment composition is usually accomplished by contacting the used oils or fats with the treating composition at temperatures above the solidification temperature of the oils or fats. Preferably, the temperature of the liquid oils or fats to be purified is within the temperature range from about 120° C. to about 190° C. Lower temperatures affect the efficiency of the treatment, while higher temperatures may cause the oils or fats to further degrade, thus causing losses.

Contacting of the liquid oils and fats can be accomplished according to conventional methods. For example, the treating composition can be uniformly dispersed in the oil or fat to be purified and kept dispersed during the treatment by agitation. After the treatment is finished the purified oil or fat can be separated from the spent treating agent by filtration, centrifuging or decantation. It is also possible to conduct the hot oils or fats through a filter cartridge filled with the treating agent.

The quantity of treatment agent utilized per weight unit of used oil or fat depends on the degree of contamination of the oils or fats to be treated. It has been found that acceptable purification can be achieved in terms of color improvement, free fatty acid and soap removal, and polar body elimination when the weight of treating agent to oil or fat is kept in the range from about 1% to 10%, preferably 1.5-3% by weight. Higher ratios naturally improve the effectiveness, the balancing factor to be taken into consideration is the ease and rate by which the purified oils and fats can be separated from the spent treating agent. Treatment times depend on the manner of treatment, the temperature of the oils and fats to be treated, the ratio of treating agent to the material to be treated, the type of oils and fats treated and the degree of contamination of the used fats and oils. Consequently, no set treating times can be given which would apply under all circumstances. It can however be stated, that under the usual treatment conditions, i.e. using the treatment temperature range set out above and the minimum treatment agent to used oil or fat weight ratio referred to before, treatment times as short as 3 minutes were found to result in satisfactory purification when the treating agent was substantially uniformly dispersed within the used oil or fat.

Subsequent to the treatment with the novel treating composition and after separation of the spent treating agent, the treated and purified oil or fat is ready for reuse. The spent treating agent is generally discarded. If desired, fresh unused oil or fat may be added to the purified oil or fat. This addition generally lenthens the service life of the oil or fat and allows multiple regenerations or rejuvenations after repeated use.

The following Examples will further illustrate the effectiveness of the novel treating composition for purifying used frying oils and fats.

EXAMPLE I

Tallow/cottonseed oil-based frying medium, used for deep frying of breaded chicken pieces and containing as a result of oxidative degradation color bodies, free fatty acids, soaps and polar compounds was subjected to purification. The used frying medium was kept at a temperature of about 177° C. and 60 g of treating agent containing 45% by weight of gel-derived alumina, balance activated clay, was added to each kg of used oil. The treating agent was thoroughly dispersed in the used frying medium and the contact between the frying medium and the treating agent was kept for 5 minutes under agitation. Subsequently, the suspended solids were removed by filtration. The purified frying medium was then analyzed for color, free fatty acid, soap and polar compound content. The purification test was repeated using under the same testing conditions the following materials for purification: activated bentonite clay, gel-derived alumina, magnesium silicate and diatomaceous earth. The results were tabulated and are shown in Table I.

TABLE I

Comparison of the Purification Effectiveness of Different Treating Materials on Used Frying Medium.

TALLOW/COTTONSEED-BASED FRYING OIL

| TREATING MATERIAL | COLOR (LOVI-BOND-RED) | FREE FATTY ACID % BY WT. | SOAP ppm | POLAR BODY CONTENT FOS No.[1] |
|---|---|---|---|---|
| Gel-derived alumina + activated bentonite | 2.8 | 2.41 | 0 | 3.28 |
| Gel-derived alumina | 3.2 | 1.85 | 4 | 3.48 |
| Activated bentonite | 2.1 | 3.45 | 0 | 3.01 |
| Magnesium silicate | 2.9 | 2.37 | 107 | 3.32 |
| Untreated | 3.5 | 2.92 | 67 | 3.65 |

[1]Polar body content (FOS number) was determined by using a "Food Oil Sensor", available from Northern Instrument Corporation. The instrument measures relative dielectric constants for oils and the dielectric constants are correlated with the weight percent polar material in the oils.

EXAMPLE II

Tallow/cottonseed frying medium was employed for frying breaded chicken pieces. The used frying medium, containing color bodies, free fatty acids, soaps and polar compounds, was subjected to purification using a gel-derived alumina-clay composition, containing 25% by weight gel-derived alumina, balance activated bentonite. The treatment as accomplished at about 177° C. by contacting the impure frying medium for about 5 minutes with the treating composition under agitation. The quantity of treating composition utilized was about 6% by weight of the frying medium. The tests were repeated with fresh samples of impure frying oil using 35:65 and also 50:50 mixtures of gel-derived alumina-activated bentonite compositions. Comparison tests were also run with: gel-derived alumina, activated bentonite, magnesium silicate, diatomaceous earth and activated carbon. The results are shown in Table II.

TABLE II

Comparison of the Purification Effectiveness of Different Treating Materials on Used Frying Medium.

TALLOW/COTTONSEED FRYING OIL

| TREATING MATERIAL | COLOR (LOVI-BOND-RED) | FREE FATTY ACID % BY WT. | SOAP ppm | POLAR BODY CONTENT FOS No. |
|---|---|---|---|---|
| Gel-derived alumina + activated bentonite (25%:75% mixture) | 1.78 | 3.47 | 0 | 3.73 |
| Gel-derived alumina + activated bentonite (35%:65% mixture) | 1.78 | 3.33 | 0 | 3.83 |
| Gel-derived alumina + | 1.80 | 3.17 | 0 | 3.88 |

TABLE II-continued

Comparison of the Purification Effectiveness of
Different Treating Materials on Used Frying Medium.
TALLOW/COTTONSEED FRYING OIL

| TREATING MATERIAL | COLOR (LOVI-BOND-RED) | FREE FATTY ACID % BY WT. | SOAP ppm | POLAR BODY CONTENT FOS No. |
|---|---|---|---|---|
| activated bentonite (50%:50% mixture) | | | | |
| Gel-derived alumina | 1.90 | 2.62 | 0 | 4.00 |
| Activated bentonite | 1.65 | 4.57 | 0 | 3.37 |
| Magnesium silicate | 1.98 | 3.53 | 1500 | 4.02 |
| Diatomaceous earth | 2.10 | 3.78 | 92 | 4.39 |
| Activated carbon | 1.92 | 3.47 | 55 | 4.17 |
| Untreated | 2.00 | 3.79 | 22 | 4.15 |

EXAMPLE III

The purification test was repeated with a used vegetable frying oil which was utilized for frying multiple products, such as chicken, potatoes, fish and taco shells. Purification was accomplished under the same treatment conditions described in Example II. The purification results were tabulated and are shown in Table III.

TABLE III

Comparison of the Purification Effectiveness of
Different Treating Materials on Used Frying Medium.
VEGETABLE FRYING OIL

| TREATING MATERIAL | COLOR (LOVI-BOND-RED) | FREE FATTY ACID % BY WT. | SOAP ppm | POLAR BODY CONTENT FOS No. |
|---|---|---|---|---|
| Gel-derived alumina + activated bentonite (25%:75% mixture) | 1.70 | 3.85 | 0 | 0.74 |
| Gel-derived alumina + activated bentonite (35%:65% mixture) | 1.78 | 3.74 | 0 | 0.75 |
| Gel-derived alumina + activated bentonite (50%:50% mixture) | 1.88 | 3.60 | 0 | 0.79 |
| Gel-derived alumina | 2.42 | 2.94 | 0 | 0.92 |
| Activated bentonite | 0.98 | 4.58 | 0 | 0.57 |
| Magnesium silicate | 2.58 | 3.95 | 1680 | 0.97 |
| Diatomaceous earth | 2.88 | 4.25 | 94 | 1.13 |
| Untreated | 2.70 | 4.27 | 20 | 1.08 |

EXAMPLE IV

The purification test was repeated by treating a tallow-cottonseed shortening, which was previously used for frying breaded chicken pieces, with magnesium silicate - gel alumina mixtures. The treatment was accomplished at about 177° C. and the used shortening was contacted for about 5 minutes with about 6% by weight magnesium silicate - gel alumina mixture. For comparison purposes, individual magnesium silicate and gel-derived alumina were also used for purification. The results were tabulated and are shown in Table IV.

TABLE IV

Purification of Used Shortening

| Treating Material | Color (Lovibond Red) | Free Fatty Acid (Wt. %) | Soap ppm | Polar Body Content (FOS No.) |
|---|---|---|---|---|
| 30% Gel-derived alumina 70% Mag. silicate | 2.78 | 3.68 | 32 | 3.44 |
| 35% Gel-derived alumina 65% Mag. silicate | 2.78 | 3.64 | 23 | 3.44 |
| 40% Gel-derived alumina 60% Mag. silicate | 2.80 | 3.59 | 24 | 3.48 |
| 50% Gel-derived alumina 50% Mag. silicate | 2.82 | 3.56 | 14 | 3.49 |
| Magnesium silicate | 2.70 | 3.84 | 141 | 3.31 |
| Gel-derived alumina | 3.02 | 3.32 | 2 | 3.56 |
| Untreated oil | 3.25 | 4.57 | 34 | 3.69 |

From the results shown in the Examples it becomes clear that the gel-derived alumina-activated bentonite or magnesium silicate treating compositions provide an overall improved purification efficiency in comparison to the individual components and also in comparison to prior art purification agents.

It is apparent from the description and the examples that various changes and modifications may be made to the invention without departing from the spirit thereof. Accordingly, the scope of the invention is only limited by the appended claims.

What is claimed is:

1. A used frying oil or fat treating composition consisting essentially of a mixture of gel-derived alumina and acid activated bentonite or magnesium silicate, the mixture containing from about 15 to about 75% by weight of gel-derived alumina, balance acid activated bentonite or magnesium silicate.

2. A composition according to claim 1, wherein the mixture contains from about 30 to about 50% by weight of gel-derived alumina, balance acid activated bentonite or magnesium silicate.

3. A composition according to claim 2, wherein at least about 40% by weight of the acid activated bentonite or magnesium silicate particles pass through a screen having openings of 0.074 mm and at least about 60% by weight of the gel-derived particles pass through a screen having openings of 0.074 mm.

* * * * *

UNITED STATES PATENT AND TRADEMARK OFFICE
CERTIFICATE OF CORRECTION

PATENT NO. : 4,701,438
DATED : October 20, 1987
INVENTOR(S) : Dennis R. Taylor, Kevin P. Gallavan It is certified that error appears in the above-identified patent and that said Letters Patent is hereby corrected as shown below:

On the title page assignee should read

--(73) Assignee: Harshaw/Filtrol Partnership --.

Signed and Sealed this

Twenty-fourth Day of May, 1988

*Attest:*

DONALD J. QUIGG

*Attesting Officer*  *Commissioner of Patents and Trademarks*